(12) United States Patent
Kadosh et al.

(10) Patent No.: US 8,468,918 B2
(45) Date of Patent: Jun. 25, 2013

(54) MILLING CUTTER

(75) Inventors: Shimon Kadosh, Nahariya (IL); Yousef Barhoom, Fasuta (IL)

(73) Assignee: Iscar, Ltd., Tefen (IL)

( * ) Notice: Subject to any disclaimer, the term of this patent is extended or adjusted under 35 U.S.C. 154(b) by 356 days.

(21) Appl. No.: 12/908,607

(22) Filed: Oct. 20, 2010

(65) Prior Publication Data

US 2011/0097166 A1    Apr. 28, 2011

(30) Foreign Application Priority Data

Oct. 22, 2009  (IL) .......................................... 201722

(51) Int. Cl.
*B23C 5/08* (2006.01)
*B23C 5/26* (2006.01)

(52) U.S. Cl.
USPC ................ 82/1.11; 407/30; 407/33; 407/113; 407/67

(58) Field of Classification Search
USPC .................. 407/33, 46, 47, 48, 51, 52, 66, 67, 407/30, 113; 29/428; 83/838
See application file for complete search history.

(56) References Cited

U.S. PATENT DOCUMENTS

| 1,337,313 | A | | 4/1920 | Groene | |
|---|---|---|---|---|---|
| 3,172,437 | A | * | 3/1965 | Hansen | 144/238 |
| 5,238,037 | A | * | 8/1993 | Gunzner et al. | 144/238 |
| 5,800,079 | A | * | 9/1998 | Qvarth | 407/46 |
| 6,571,451 | B2 | * | 6/2003 | Satran et al. | 29/447 |
| 7,112,013 | B2 | * | 9/2006 | Satran et al. | 407/48 |

FOREIGN PATENT DOCUMENTS

| DE | 36 00 809 | 7/1987 |
|---|---|---|
| FR | 1 163 729 | 9/1958 |
| GB | 556 376 | 10/1943 |

OTHER PUBLICATIONS

International Search Report in PCT/IL2010/000815, dated Feb. 2, 2011.

* cited by examiner

*Primary Examiner* — Will Fridie, Jr.
(74) *Attorney, Agent, or Firm* — Womble Carlyle (57) ABSTRACT

A milling cutter includes a disk like cutter body having radially directed slots and a central aperture. An exchangeable hub of the milling cutter has two adapter members located on either side of the cutter body and has an inner side wall. One of the adapter members has at least two protrusions formed on the adapter inner side wall and one of the two adapter members has a raised portion located on the adapter inner side wall. The adapter members are secured to the cutter body by the protrusions positioned in the slots and the raised portion positioned in the central aperture.

14 Claims, 9 Drawing Sheets

MILLING CUTTER

FIELD OF THE INVENTION

The present invention relates to milling cutters and in particular to milling cutters with disk like cutter bodies.

BACKGROUND OF THE INVENTION

Such milling cutters are typically used for slotting operations and have a hub with an axially centered hole for receipt of a support shaft of a machine spindle. Since the hole has a given diameter, the milling cutter can only be used with a shaft of a given diameter.

Milling cutters with exchangeable hubs are also known, wherein hubs can be prepared with any required hole diameter. When it is required to use the milling cutter with a support shaft having a diameter different from that of the hole diameter, the hub which is attached to the cutter body can be removed and a new hub with the required diameter can be attached to the cutter body in its place. However they generally employ screws (or bolts) to attach the hub to the cutter body. The use of screws is time consuming and may be disadvantageous in that rotative motion is imparted by the hub to the cutter body via the screws, thereby exposing the screws to shear forces which could damage them.

U.S. Pat. No. 7,112,013 discloses a milling cutter with an exchangeable hub. The milling cutter has a disk like cutter body having radially directed slots and a central aperture. The exchangeable hub comprises two adapter members located on either side of the cutter body. One of the adapter members has a raised portion located in the central aperture. The adapter members are secured to the cutter body by means of pins which are located in blind holes in the adapter members and which pass through engagement members positioned in the slots. The pins and the engagement members are detached from the adapter members, which can result in longer production time and less firm device.

SUMMARY OF THE INVENTION

In accordance with the present invention there is provided a milling cutter having an axis of rotation and comprising:

a generally disk-shaped cutter body, having two side surfaces and an outer peripheral surface therebetween, the axis of rotation being perpendicular to the side surfaces;

a plurality of circumferentially spaced apart cutting portions located around the outer peripheral surface of the cutter body;

a central aperture in the cutter body, having an aperture inner surface;

at least two radially directed slots in the cutter body, each slot having a slot inner surface opening out to the central aperture;

In accordance with embodiments of the present invention, there are provided two adapter members located on either side of the cutter body, each adapter member having an inner side wall in abutment with respective side surfaces of the cutter body, the two adapter members each having central holes and drive keyway members, one of the adapter members having at least two protrusions formed on the adapter inner side wall;

In accordance with embodiments of the present invention, there is provided an axially extending circularly shaped raised portion located on the inner side wall of one of the adapter members and concentric with the central hole thereof, the raised portion having an outer surface in juxtaposition with the aperture inner surface; each protrusion having a peripheral surface in juxtaposition with the slot inner surface.

In accordance with some embodiments, the slots are generally rectangular in shape.

In accordance with some embodiments, the protrusions are generally rectangular in shape.

There is also provided in accordance with embodiments of the present invention a method for constructing a milling cutter comprising the steps of:

(i) providing a generally disk-shaped cutter body, having first and second side surfaces and a central aperture and at least two radially directed slots, each slot having a slot inner surface opening out to the central aperture;

(ii) providing first and second adapter members, each adapter member comprising a central hole, an inner side wall and a drive keyway member, the second adapter member having at least two protrusions, each protrusion having a peripheral surface formed in the adapter inner side wall, and one of the first and second adapter members having an axially extending circularly shaped raised portion concentric with the central hole thereof, the raised portion having an outer surface and an inner surface;

(iii) placing the second adapter member adjacent the second side surface of the cutter body with the protrusions located in the slots; and (iv) placing the first adapter member adjacent the first side surface of the cutter body, such that the inner side wall of the first adapter member abuts the first side surface, and the drive keyway member of the first adapter member is adjacent the drive keyway member of the second adapter member;

wherein the raised portion is located in the aperture of the cutter body.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE PRESENT INVENTION

Figure 1:
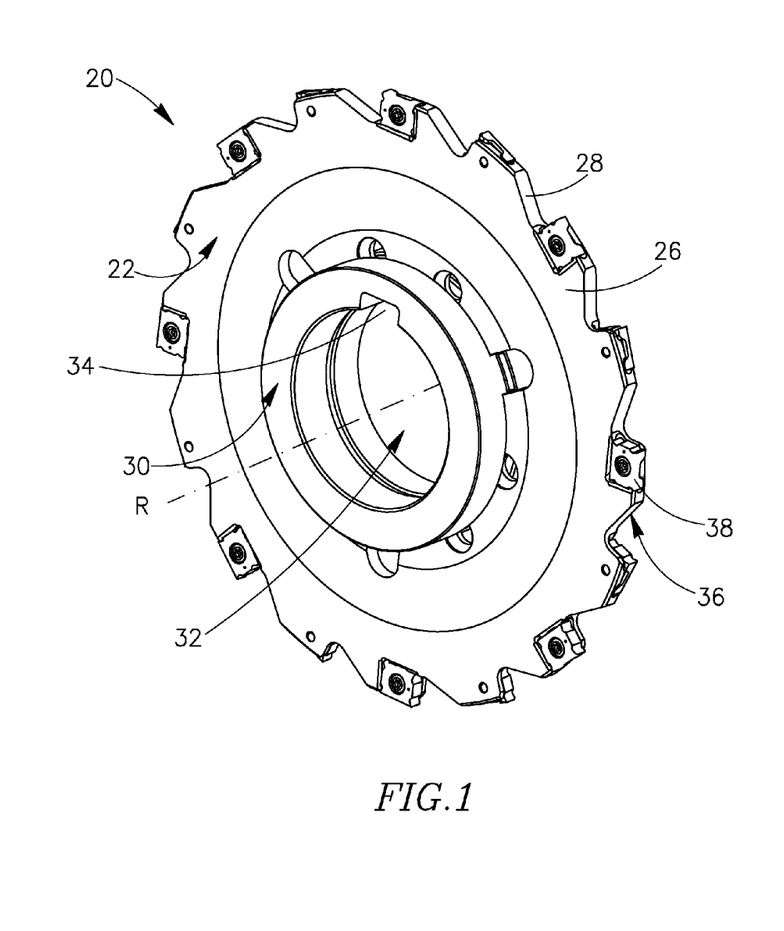
FIG. 1 is a perspective view of a milling cutter according to a first embodiment of the present invention.
Figure 2:
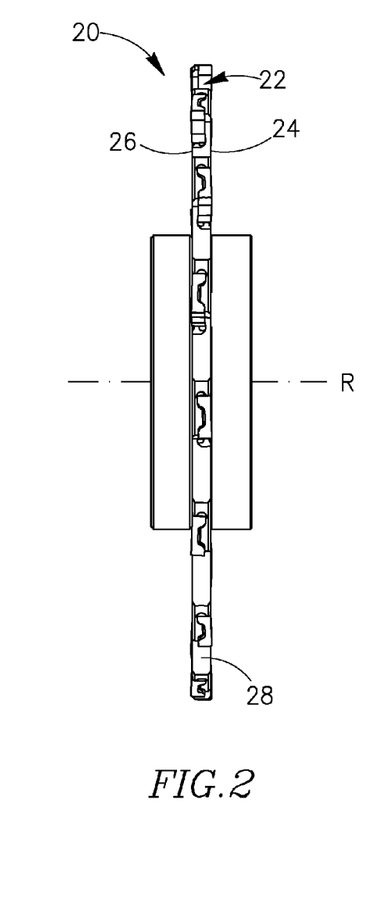
FIG. 2 is an edge view of the milling cutter shown in FIG. 1.

Attention is drawn to FIGS. 1 and 2, showing a milling cutter 20 in accordance with a first embodiment of the present invention. The milling cutter 20 has a generally disk-shaped cutter body 22, having first and second opposing, generally parallel, side surfaces 24, 26 and an outer peripheral surface 28 extending between the two side surfaces 24, 26. The milling cutter 20 has an axis of rotation R which is perpendicular to the two side surfaces 24, 26. The milling cutter 20 has a hub 30 with an axially centered hub hole 32 for receipt of a support shaft of a machine spindle (not shown). Rotative motion is imparted to the hub 30 of the cutter via a drive key (also not shown) which mates with a drive keyway 34. A plurality of circumferentially spaced apart cutting portions 36 are located around the outer peripheral surface 28 of the cutter body 22, each cutting portion 36 being provided with a cutting insert 38.

Figure 3:
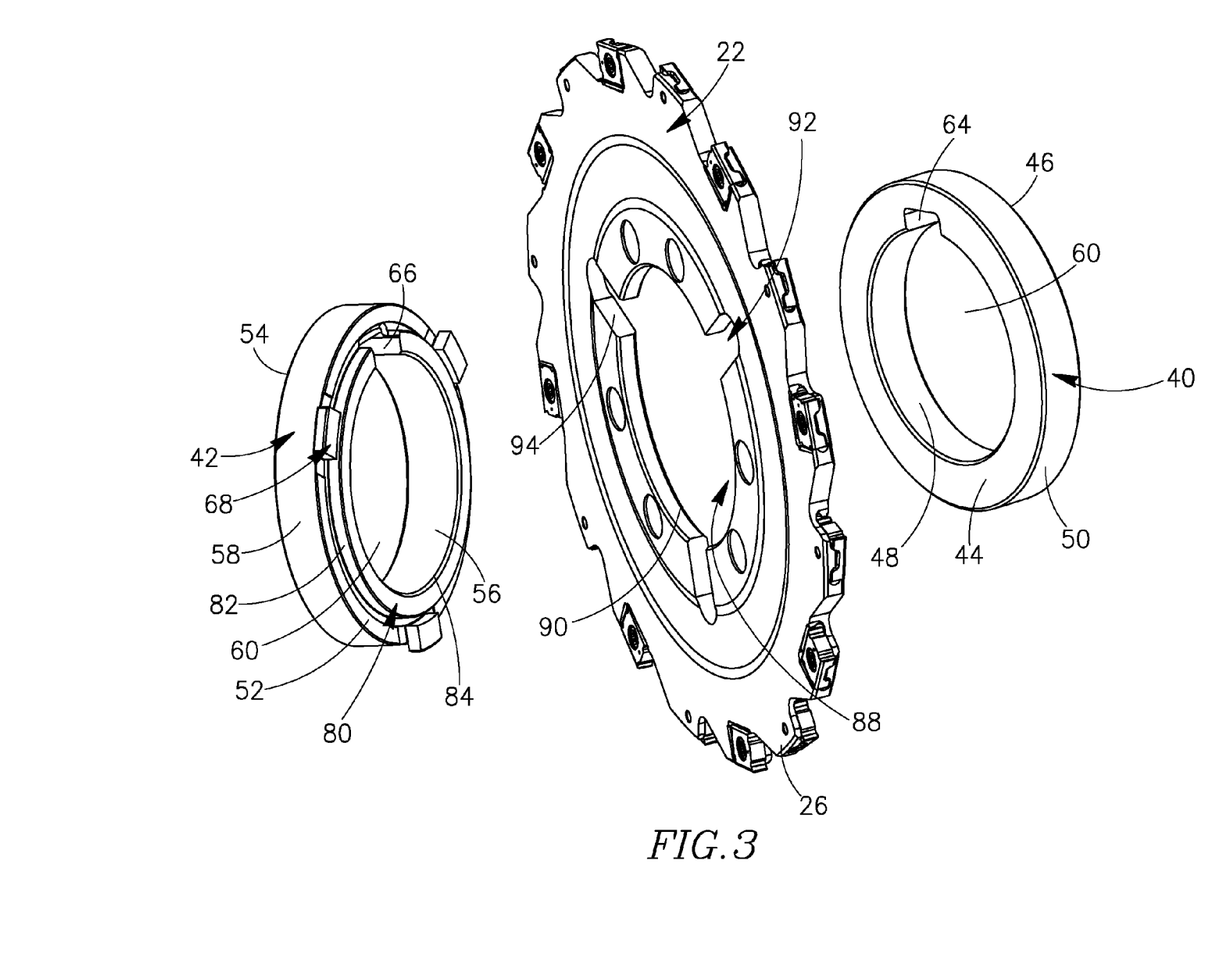
FIG. 3 is an exploded view of the milling cutter shown in FIG. 1.

Attention is now additionally drawn to FIG. 3. The hub 30 includes first and second adapter members 40, 42 located on either side of the cutter body 22. The first adapter member 40 has a first inner side wall 44, an opposing first outer side wall 46 and first inner and outer peripheral edge surfaces 48, 50 extending therebetween. Similarly, the second adapter member 42 has a second inner side wall 52, an opposing second outer side wall 54 and second inner and outer peripheral edge surfaces 56, 58 extending therebetween. The first and second adapter members 40, 42 have axially centered identical central holes 60. The central holes 60 form together the hub hole 32. Similarly, the first and second adapter members 40, 42 have first and second drive keyway members 64, 66, respectively, which together form the drive keyway 34 of the hub 30.

Figure 4:
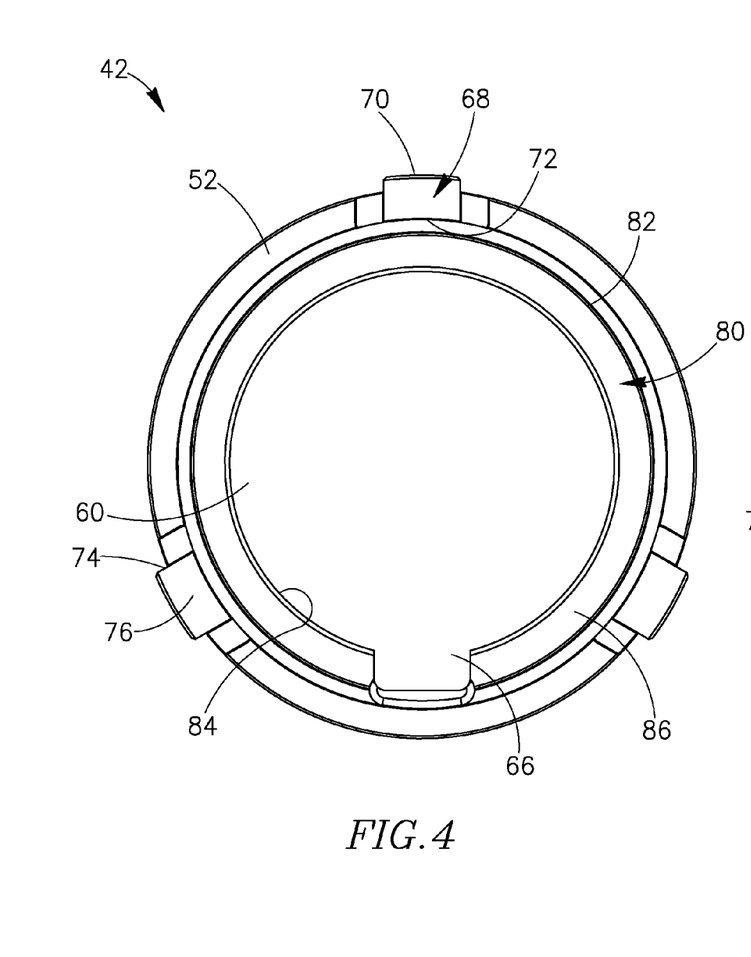
FIG. 4 is a side view of a second adapter member according to the first embodiment of the present invention showing its inner side wall.
Figure 5:
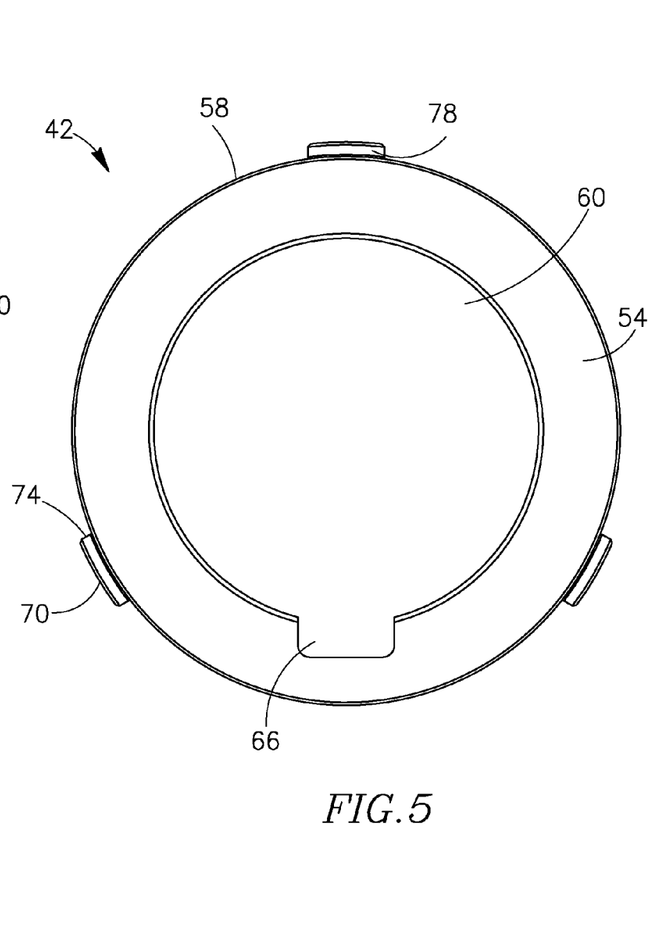
FIG. 5 is a side view of the second adapter member shown in FIG. 4 showing its outer side wall.
Figure 6:
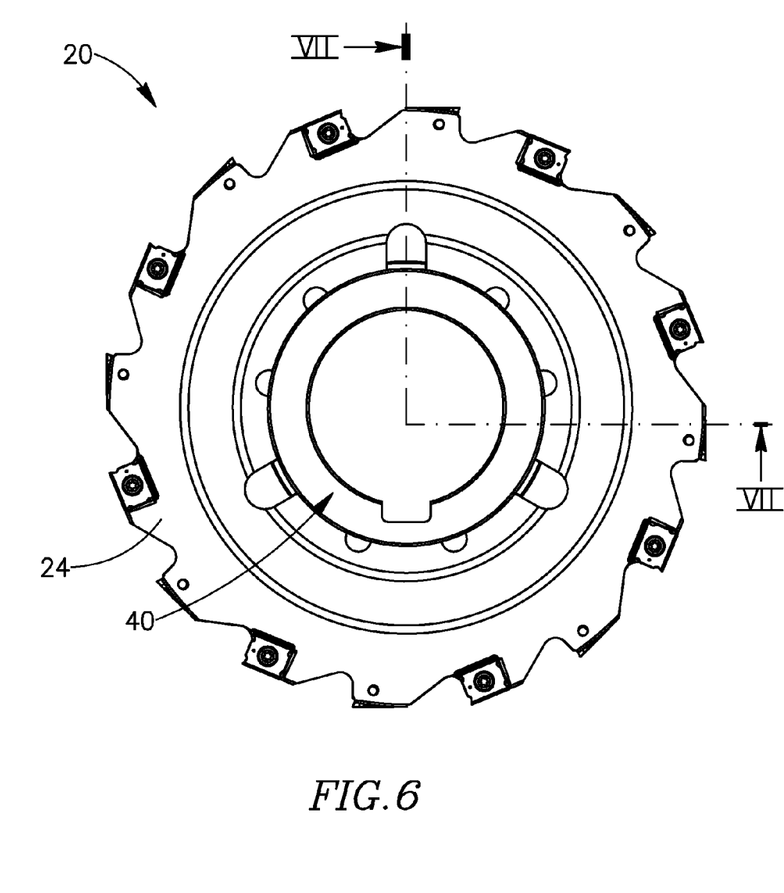
FIG. 6 is a side view of the milling cutter shown in FIG. 1.
Figure 7:
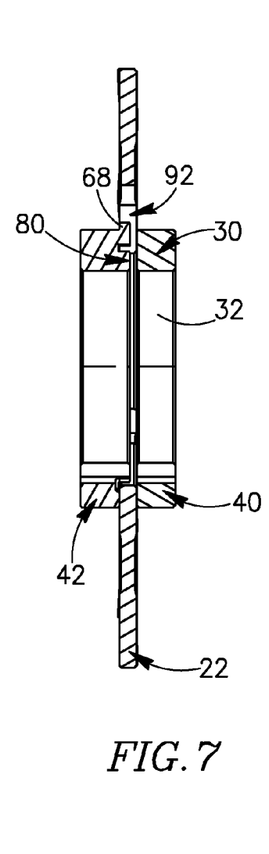
FIG. 7 is a cross sectional view taken along the line VII-VII in FIG. 6.

Attention is now drawn to FIGS. 4 and 5. The second adapter member 42 has three protrusions 68 formed on the second inner side wall 52 and protrudes therefrom. Each protrusion 68 includes a radially outer end 70, an opposing radially inner end 72, and a peripheral surface 74 extending therebetween. The protrusion 68 further contains inner and outer side surfaces 76, 78. The outer side surface 78 is partly in abutment with the second inner side wall 52 and partly protrudes from the second outer peripheral edge surface 58.

Each protrusion 68 is adjacent to an axially extending circularly shaped raised portion 80 concentric with the central hole 60 of the second adapter member 42. The raised portion 80 has an outer surface 82 and an inner surface 84 and an axially facing annularly shaped bridging surface 86 extending between the outer surface 82 and the inner surface 84. The inner surface 84 forms part of the inner peripheral edge surfaces 56.

As can be seen in FIG. 3, the cutter body 22 has a central aperture 88 bounded by an axially extending aperture inner surface 90. The cutter body 22 is provided with three radially directed generally rectangular slots 92, each having a slot inner surface 94 that open out to the central aperture 88 and to the first and second side surfaces 24, 26. At least a portion of the slot inner surface 94 faces in a circumferential direction.

In accordance with the first embodiment of the present invention, the milling cutter 20 is assembled by placing the second adapter member 42 adjacent the second side surface 26 with the raised portion 80 located adjacent the aperture 88. The second adapter member 42 is urged towards the cutter body 22 until the second inner side wall 52 abuts the second side surface 26. In this position the raised portion 80 is fully inside the aperture 88 with the outer surface 82 of the raised portion 80 in juxtaposition with the aperture inner surface 90, and each protrusion 68 is fully inside the slot 92 with the peripheral surfaces 74 of the protrusions 68 in juxtaposition with the slot inner surface 94.

Figure 8:
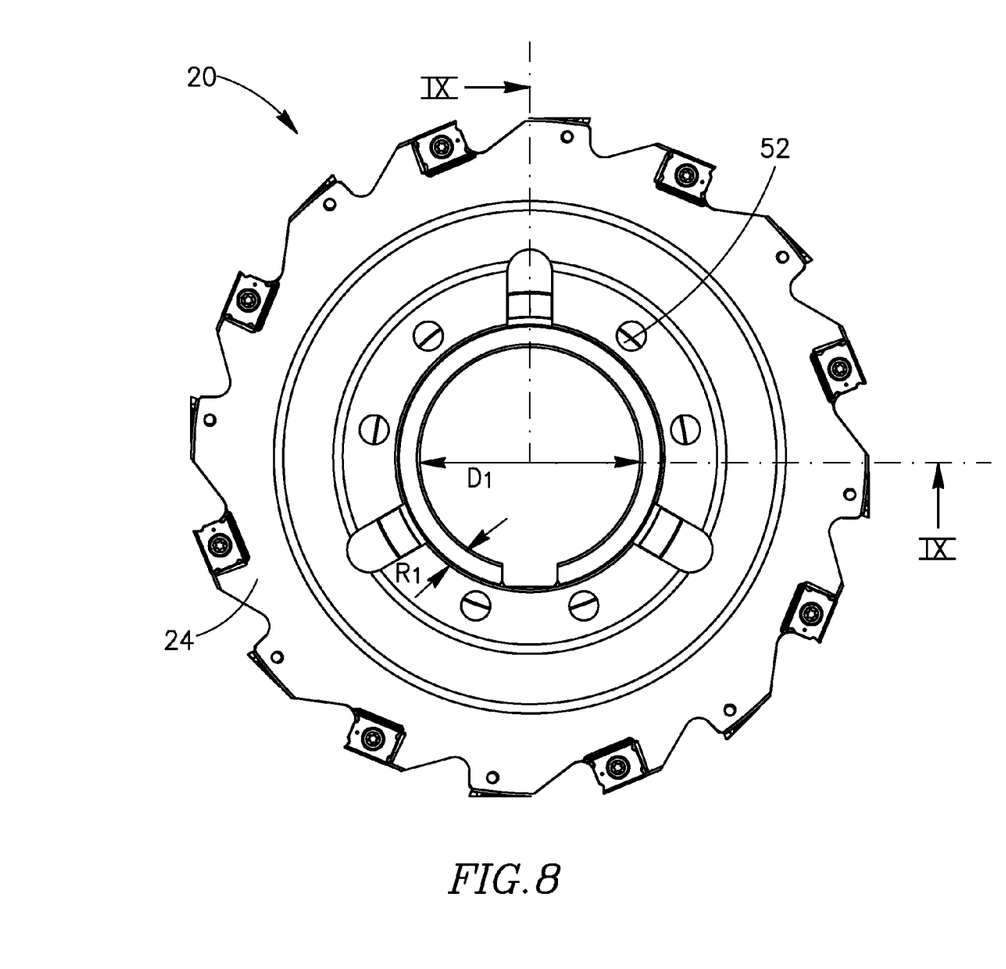
FIG. 8 is a side view of the milling cutter shown in FIG. 1 with a first adapter member removed.
Figure 9:
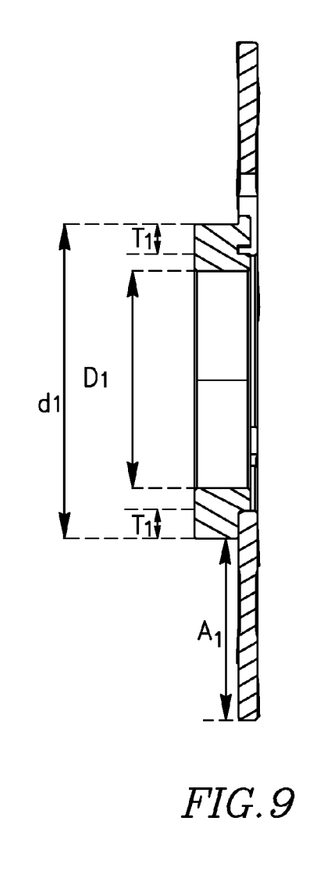
FIG. 9 is a cross sectional view taken along the line IX-IX in FIG. 8.

The milling cutter 20 is now partially assembled as shown in FIGS. 8 and 9. All that remains is to attach the first adapter member 40 to the partially assembled milling cutter 20. This is done by placing the first adapter member 40 adjacent the first side surface 24 with the first drive keyway member 64 aligned with the second drive keyway member 66. The first inner side wall 44 abuts the first side surface 24, thereby bringing the milling cutter 20 into an assembled state, that is forming the milling cutter 20, as shown in FIGS. 1, 2, 6 and 7. The assembly of the milling cutter 20, in accordance with the order of operations and the support shaft of a machine spindle, as described above is by no means binding. The assembly of the milling cutter 20 can be carried in and out in any desired feasible order.

As mentioned above, the hub hole 32 receives a support shaft of a machine spindle for rotating the milling cutter 20. Wherein, rotative motion is imparted to the hub 30 via a drive key of the support shaft which mates with drive keyway 34. In turn, the hub 30 imparts rotative motion to the cutter body 22 via the coupling between the protrusions 68 and the slots 92.

With respect to FIGS. 8 and 9, the following five parameters are defined: the hole diameter D1 of the hub 30 (which is equal to the diameters of the central holes 60), the hub diameter d1, the radial thickness R1 of the raised portion 80, the radial depth T1 of the second inner side wall 52, and the depth of cut A1 of the milling cutter. These parameters are required when comparing two similar milling cutters as will be done below.

The milling cutter 20 shown in FIGS. 1 to 9, in accordance with the first embodiment of the present invention, can only be used in conjunction with a support shaft having a diameter generally equal to, but slightly less than, the diameter D1 of the hub hole 32. If the milling cutter is to be used with a different machine spindle having a support shaft with a different diameter, then a hub having a hole with an appropriate diameter (generally equal to, but slightly greater than, the diameter of the support shaft) has to be used.

Figure 10:
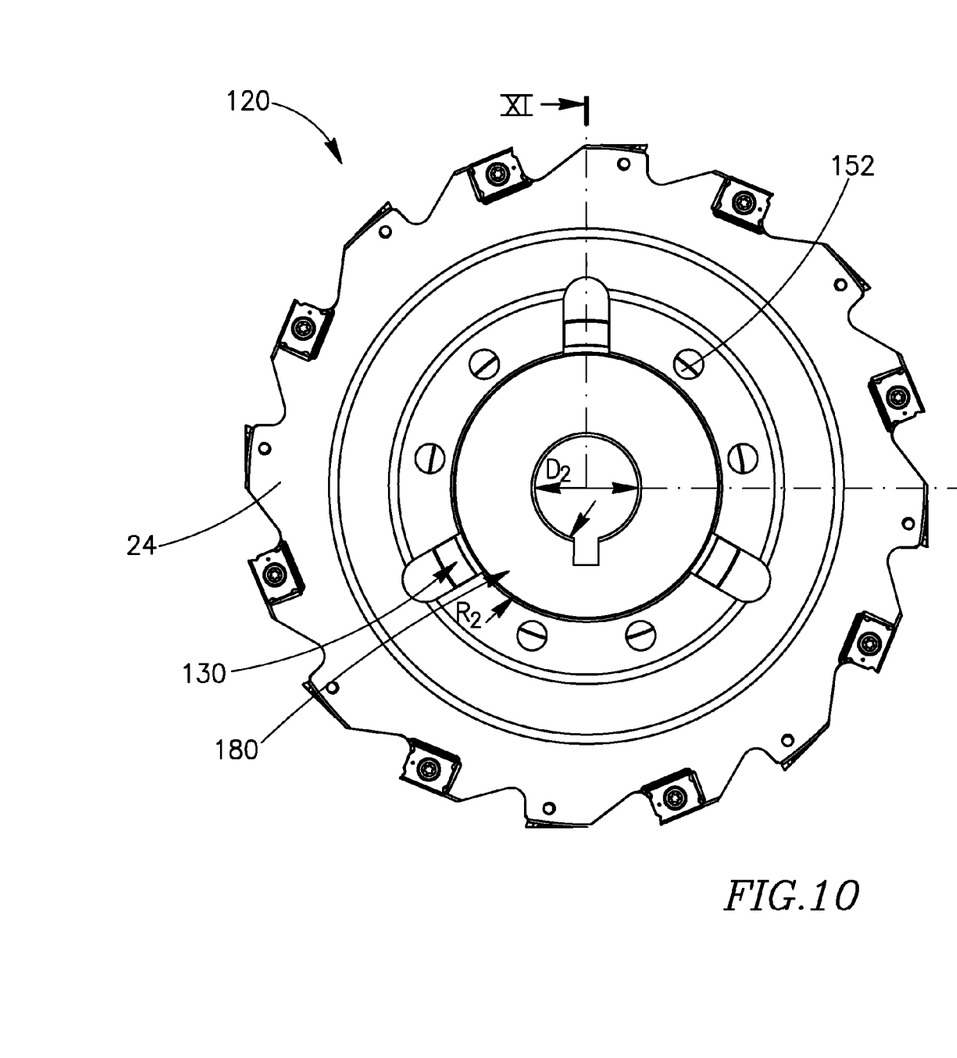
FIG. 10 is a side view of the milling cutter in accordance with the present invention with a hub having a different diameter to that shown in FIGS. 1 to 9, with the first adapter member removed.
Figure 11:
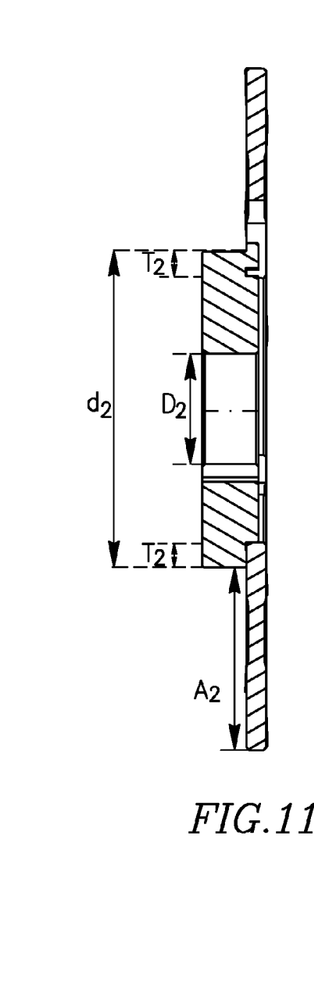
FIG. 11 is a cross sectional view taken along the line XI-XI in FIG. 10.

Attention is now drawn to FIGS. 10 and 11, showing a milling cutter 120 in accordance with a variation of the first embodiment of the present invention, suitable for use with a support shaft having a smaller diameter than the milling cutter 20 shown in FIGS. 1 to 9. The hole diameter D2 of a hub 130 of the milling cutter 120 is smaller than the hole diameter D1 of the hub 30 of the milling cutter 20. The radial thickness R2 of a raised portion 180 of the hub 130 of the milling cutter 120 is larger than the radial thickness R1 of the raised portion 80 of the hub 30 of the milling cutter 20. Respectively, the radial depth T2 of a second inner side wall 152 of the milling cutter 120 can be made smaller than the radial depth T1 of the second inner side wall 52 of the milling cutter 20. The hub diameter d2 of the milling cutter 120 is smaller than the hub diameter d1 of the milling cutter 20, a direct result of reducing the radial depth T2 of the second inner side wall 152 of the milling cutter 120. As a result, the milling cutter 120 has a greater depth of cut A2 than the depth of cut A1 of the milling cutter 20.

Attention is now drawn to FIGS. 12 to 16 showing a milling cutter 220 in accordance with a second embodiment of the present invention. Since the milling cutter 220 has many features which are similar to those of the milling cutter 20, the similar features of the milling cutter 20 will be referred to herein below by reference numerals which are shifted by 200 from those of the milling cutter 20. In the second embodiment, a first adapter member 240 of the milling cutter 220 includes a raised portion 280, and a second adapter member 242 of the milling cutter 220 includes protrusions 268. In other words, in the second embodiment, the protrusions and the raised portion are on different adapter members.

Figure 12:
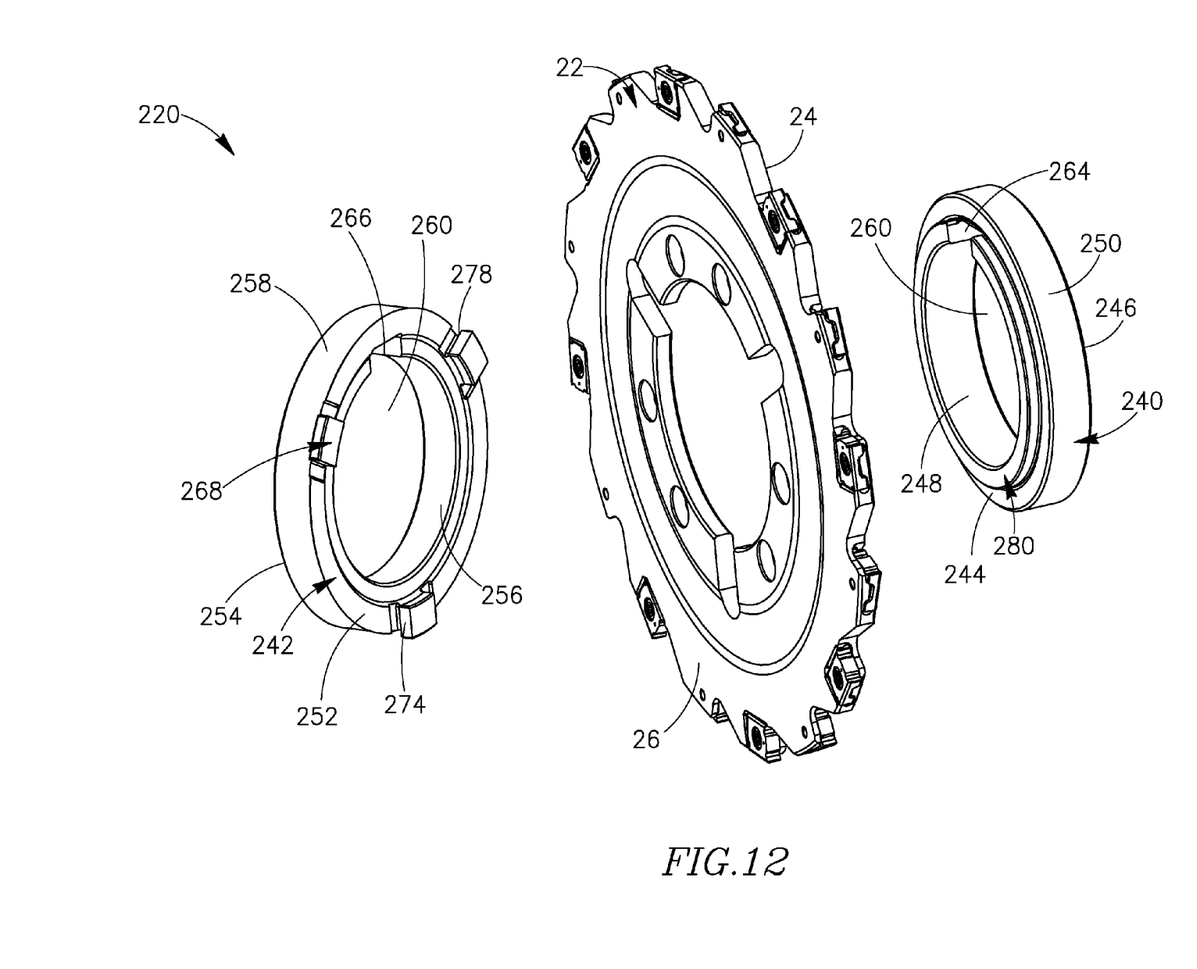
FIG. 12 is an exploded view of a milling cutter according to a second embodiment of the present invention.
Figure 14:
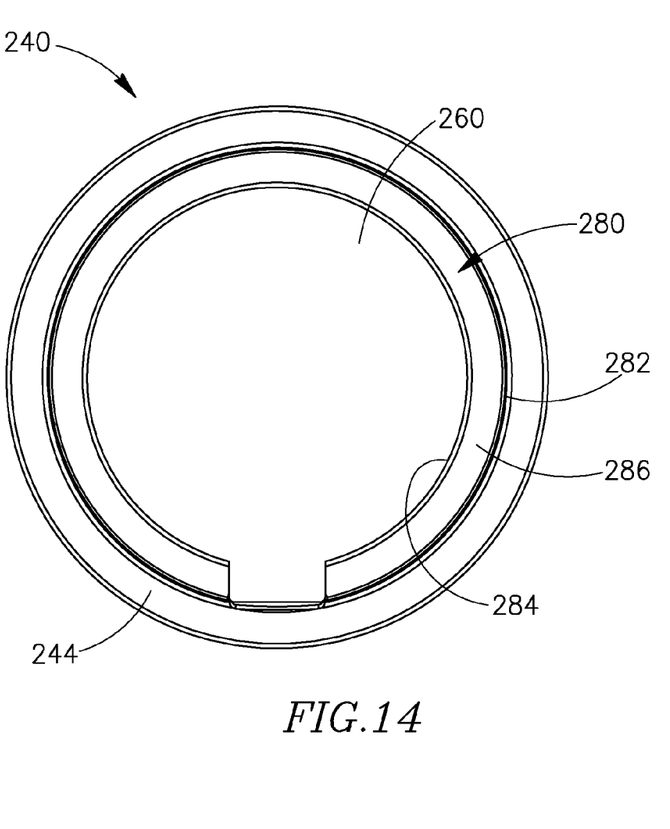
FIG. 14 is side view of a first adapter member according to the second embodiment of the present invention showing its inner side wall.

A first adapter member 240 has a first inner side wall 244, an opposing first outer side wall 246 and first inner and outer peripheral edge surfaces 248, 250 extending therebetween. Similarly, the second adapter member 242 has a second inner side wall 252, an opposing second outer side wall 254 and second inner and outer peripheral edge surfaces 256, 258 extending therebetween. The first and second adapter members 240, 242 have axially centered central holes 260. The central holes 260 form together a hub hole 232 of a hub 230 of the milling cutter 220. Similarly, the first and second adapter members 240, 242 have first and second drive keyway members 264, 266, respectively, which together form a drive keyway 234 of the hub 230.

Figure 13:
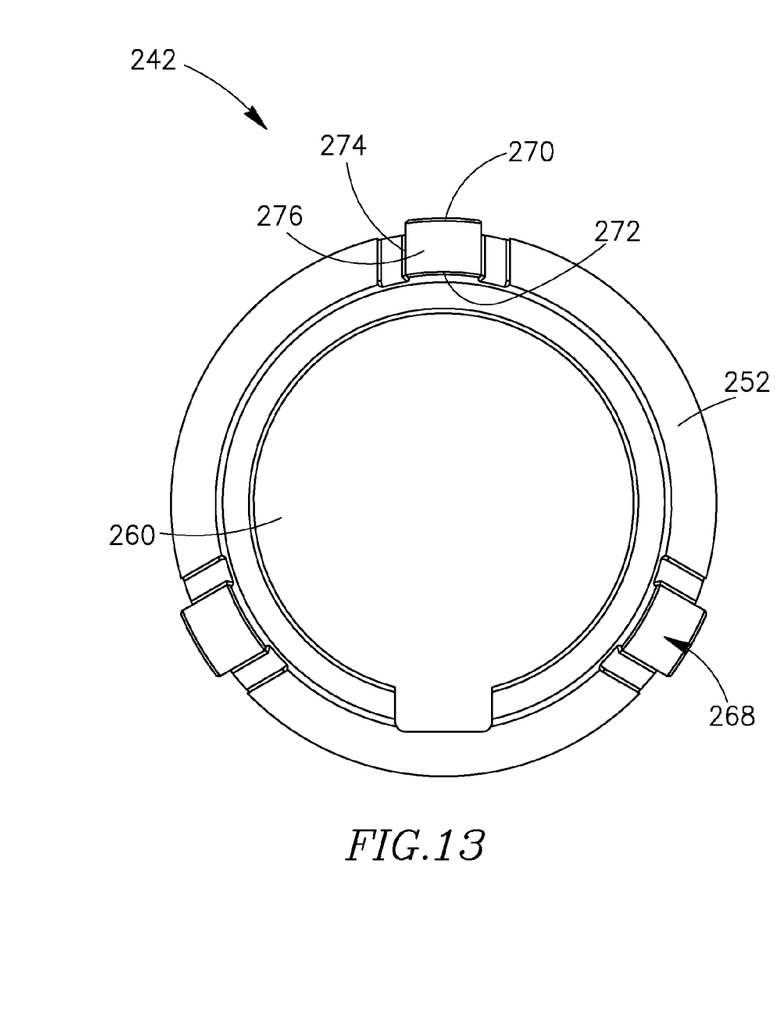
FIG. 13 is a side view of a second adapter member according to the second embodiment of the present invention showing its inner side wall.

The second adapter member 242 has three protrusions 268 formed on the second inner side wall 252 and protrudes therefrom. Each protrusion 268 includes a radially outer end 270, an opposing radially inner end 272, and a peripheral surface 274 extending therebetween. The protrusion 268 further includes inner and outer side surfaces 276, 278. The outer side surface 278 is partly in abutment with the second inner side wall 252 and partly protrudes from the second outer peripheral edge surface 258.

The first adapter member 240 has an axially extending circularly shaped raised portion 280 concentric with the central hole 260. The raised portion 280 has an outer surface 282 and an inner surface 284 and an axially facing annularly shaped bridging surface 286 extending between the outer surface 282 and the inner surface 284. The inner surface 284 forms part of the inner peripheral edge surfaces 256.

In accordance with the second embodiment of the present invention, the milling cutter 220 is assembled by placing the second adapter member 242 adjacent the second side surface 26 of the cutter body 22 with the protrusions 268 adjacent the slots 92. The second adapter member 242 is urged towards the cutter body 22 until the second inner side wall 252 abuts the second side surface 26. In this position each protrusion 268 is fully inside the slot 92 with the peripheral surfaces 274 in juxtaposition with the slot inner surface 94.

Figure 15:
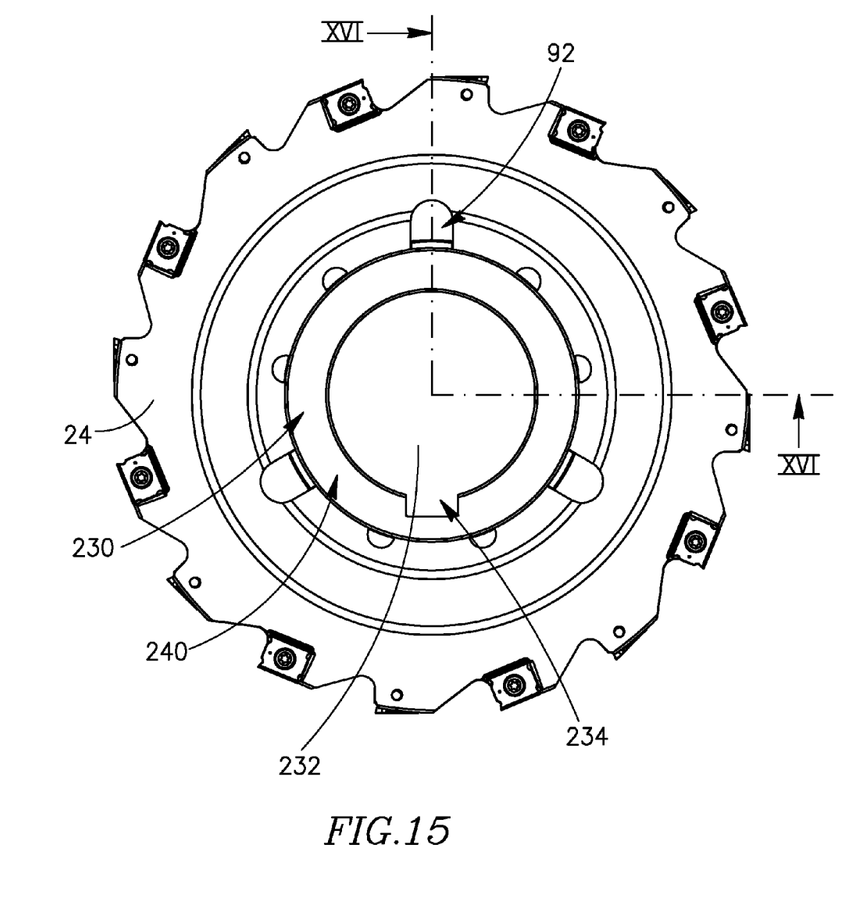
FIG. 15 is a side view of the milling cutter shown in FIG. 12.
Figure 16:
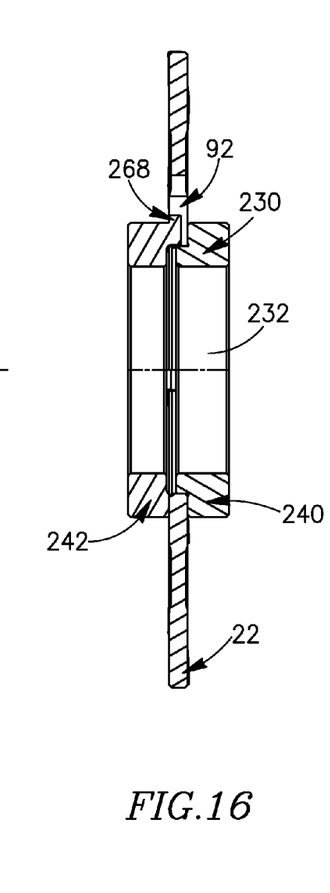
FIG. 16 is a cross sectional view taken along the line XVI-XVI in FIG. 15.

All that remains is to urge the first adapter member 240 towards the partially assembled milling cutter 220. This is done by placing the first adapter member 240 adjacent the first side surface 24 with the raised portion 280 located adjacent the aperture 88. In this position the raised portion 280 is fully inside the aperture 88 with the outer surface 282 in juxtaposition with the aperture inner surface 90, the first inner side wall 244 abuts the first side surface 24, and the first drive keyway member 264 is aligned with the second drive keyway member 266, thereby bringing the milling cutter 220 into an assembled state, that is forming the milling cutter 220, as shown in FIGS. 15 and 16.

The hub hole 232 receives a support shaft of a machine spindle for rotating the milling cutter 220. Wherein, rotative motion is imparted to the hub 230 via a drive key of the support shaft which mates with drive keyway 234. In turn, the hub 230 imparts rotative motion to the cutter body 22 via the coupling between the protrusions 268 and the slots 92. The first and second adapter members 240, 242 of the milling cutter 220, in accordance with the second embodiment of the present invention, are firmly secured to the milling cutter 220, even without the support shaft of a machine spindle. Furthermore, the first and second adapter members 240, 242 are easy to manufacture. In the same manner as in the first embodiment of the present invention, the assembly of the milling cutter 220 in accordance with the second embodiment can be carried in and out in any desired feasible order.

In some embodiments, each adapter member 42, 242 having the protrusions 68, 268 is integrally formed to have one-piece construction. In other embodiments, the protrusions 68, 268 may be affixed to their respective adapter members by a fastener, such as screw. Also, in some embodiments, at their radially outer ends 70, 270, the protrusions 68, 268 form the radially outermost portion of the second adapter member 42, 242.

It will be clear that a variation of the second embodiment of the present invention, suitable for use with a support shaft having a smaller diameter than that of the milling cutter 220 may be constructed in a manner similar to the variation of the first embodiment, thereby providing a milling cutter having a greater depth of cut than the depth of cut of the milling cutter 220.

It will be appreciated that the present invention not only provides a particularly efficient and firm way of changing adapters in accordance with the diameter of the spindle support shaft, with the use of an integral device, but at the same time facilitates increasing the depth of cut of the milling cutter.

Although the present invention has been described to a certain degree of particularity, it should be understood that various alterations and modifications could be made without departing from the scope of the invention as hereinafter claimed.

What is claimed is:

1. A milling cutter (20, 120, 220) having an axis of rotation (R) and comprising:
    a generally disk-shaped cutter body (22), having two side surfaces (24, 26) and an outer peripheral surface (28) therebetween, the axis of rotation (R) being perpendicular to the side surfaces (24, 26);
    a plurality of circumferentially spaced apart cutting portions (36) located around the outer peripheral surface (28) of the cutter body (22);
    a central aperture (88) in the cutter body (22), having an aperture inner surface (90);
    at least two radially directed slots (92) in the cutter body (22), each slot (92) having a slot inner surface (94) opening out to the central aperture (88);
    two adapter members (40, 42, 240, 242) located on either side (24, 26) of the cutter body (22), each adapter member (40, 42, 240, 242) having an inner side wall (44, 52, 152, 244, 252) in abutment with respective side surfaces (24, 26) of the cutter body (22), the two adapter members (40, 42, 240, 242) each having a central hole (60, 260) and a drive keyway member (64, 66, 264, 266);
    one adapter member (42, 242) having at least two protrusions (68, 268) formed on the inner side wall (52, 152, 252) thereof;
    one adapter member (42, 240) having an axially extending circularly shaped raised portion (80, 180, 280) located on the inner side wall (52, 152, 244) thereof and being concentric with the central hole (60, 260) thereof, the raised portion (80, 180, 280) having an outer surface (82, 282) in juxtaposition with the aperture inner surface (90); and each protrusion (68, 268) having a peripheral surface (74, 274) in juxtaposition with the slot inner surface (94).

2. The milling cutter according to claim 1, wherein the slots (92) are generally rectangular in shape.

3. The milling cutter according to claim 1, wherein the protrusions (68, 268) are generally rectangular in shape.

4. The milling cutter according to claim 1, wherein the raised portion is formed on a first adapter member (240) and the protrusions (68, 268) are formed on a second adapter member (42, 242).

5. The milling cutter according to claim 1, wherein the adapter member (42, 242) having the protrusions (68, 268) is integrally formed to have one-piece construction.

6. The milling cutter according to claim 1, wherein the protrusions (68, 268) form the radially outermost portion of the adapter member (42, 242) to which they belong.

7. The milling cutter according to claim 1, wherein:
the disk-shaped cutter body (22) has three slots (92), each slot having a slot inner surface (94);
the adapter member (42, 242) having protrusions is provided with three protrusions (68, 268), each protrusion having a peripheral surface (74, 274) in juxtaposition with a corresponding slot inner surface (94).

8. A milling cutter (20, 120, 220) having:
a generally disk-shaped cutter body (22) having an axis of rotation (R), two side surfaces (24, 26) with an outer peripheral surface (28) therebetween, and a central aperture (88); and
two adapter members (40, 42, 240, 242) located on either side (24, 26) of the cutter body (22), each adapter member (40, 42, 240, 242) having an inner side wall (44, 52, 152, 244, 252) in abutment with a respective side surface (24, 26) of the cutter body (22), the two adapter members (40, 42, 240, 242) each having a central hole (60, 260) and a drive keyway member (64, 66, 264, 266); wherein:
the cutter body (22) has at least two radially directed slots (92), each slot (92) having a slot inner surface (94) opening out to the central aperture (88);
one of the adapter members (42, 242) has at least two protrusions (68, 268) formed on an inner side wall (52, 152, 252) thereof, each protrusion (68, 268) having a peripheral surface (74, 274) in juxtaposition with a corresponding slot inner surface (94); and
one of the adapter members (42, 240) has an axially extending circularly shaped raised portion (80, 180, 280) located on an inner side wall (52, 152, 244) thereof, the raised portion (80, 180, 280) having an outer surface (82, 282) in juxtaposition with the aperture inner surface (90).

9. The milling cutter of claim 8, wherein:
the slots (92) are generally rectangular in shape.

10. The milling cutter of claim 9, wherein:
the protrusions (68, 268) are generally rectangular in shape.

11. The milling cutter of claim 8, wherein:
the raised portion is formed on a first adapter member (240); and
the protrusions (68, 268) are formed on a second adapter member (42, 242).

12. The milling cutter of claim 8, wherein:
the adapter member (42, 242) and the protrusions (68, 268) are integrally formed to have one-piece construction.

13. The milling cutter of claim 8, wherein:
the protrusions (68, 268) form the radially outermost portion of the adapter member (42, 242) to which they belong.

14. A method for constructing a milling cutter (20, 120, 220) comprising the steps of:
(i) providing a generally disk-shaped cutter body (22), having first and second side surfaces (24, 26) and a central aperture (88) and at least two radially directed slots (92), each slot having a slot inner surface (94) opening out to the central aperture (88);
(ii) providing first and second adapter members (40, 42, 240, 242), each adapter member comprising a central hole (60, 260), an inner side wall (44, 52, 152, 244, 252) and a drive keyway member (64, 66, 264, 266), the second adapter member (42, 242) having at least two protrusions (68, 268), each protrusion having a peripheral surface (74, 274) formed on the adapter inner side wall (52, 152, 252), and one of the first and second adapter members (42, 240) having an axially extending circularly shaped raised portion (80, 180, 280) concentric with the central hole (60, 260) thereof, the raised portion (80, 180, 280) having an outer surface (82, 282) and an inner surface (84, 284);
(iii) placing the second adapter member (42, 242) adjacent the second side surface (26) of the cutter body (22) with the protrusions (68, 268) located in the slots (92), each protrusion (68, 268) having a peripheral surface (74, 274) in juxtaposition with a corresponding slot inner surface (94); and
(iv) placing the first adapter member (40, 240) adjacent the first side surface (24) of the cutter body (22), such that the inner side wall (44, 244) of the first adapter member abuts the first side surface (24), and the drive keyway member (64, 264) of the first adapter member is adjacent the drive keyway member (66, 266) of the second adapter member (42, 242);
wherein the raised portion (80, 180, 280) is located in the aperture (88) of the cutter body (22).

\* \* \* \* \*